United States Patent
Büttner et al.

(10) Patent No.: US 12,047,199 B2
(45) Date of Patent: Jul. 23, 2024

(54) TRANSMISSION OF TELEGRAMS BY A NETWORK DISTRIBUTOR IN AN AUTOMATION NETWORK

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Thomas Rettig, Rheda-Wiedenbrück (DE); Hans Beckhoff, Verl (DE); Thorsten Bunte, Gütersloh (DE); Johannes Beckhoff, Schloß Holte-Stukenbrock (DE)

(73) Assignee: Beckhoff Automation GmbH, Verl (DE)

( * ) Notice: Subject to any disclaimer, the term of this patent is extended or adjusted under 35 U.S.C. 154(b) by 377 days.

(21) Appl. No.: 17/451,658

(22) Filed: Oct. 21, 2021

(65) Prior Publication Data

US 2022/0038306 A1 Feb. 3, 2022

Related U.S. Application Data

(63) Continuation of application No. PCT/EP2020/070826, filed on Jul. 23, 2020.

(30) Foreign Application Priority Data

Aug. 14, 2019 (DE) ...................... 10 2019 121 929.9

(51) Int. Cl.
*H04L 12/40* (2006.01)
*H04L 45/745* (2022.01)
*H04L 49/00* (2022.01)

(52) U.S. Cl.
CPC ...... *H04L 12/40169* (2013.01); *H04L 45/745* (2013.01); *H04L 49/30* (2013.01)

(58) Field of Classification Search
CPC . H04L 12/40169; H04L 45/745; H04L 49/30; H04L 45/306; H04L 45/74;
(Continued)

(56) References Cited

U.S. PATENT DOCUMENTS

| | | | | |
|---|---|---|---|---|
| 2011/0022914 A1* | 1/2011 | Bruckner | ............... | H04L 1/0082 714/747 |
| 2011/0069698 A1* | 3/2011 | Schmidt | .................. | H04L 45/00 370/351 |

(Continued)

FOREIGN PATENT DOCUMENTS

| | | |
|---|---|---|
| DE | 102015120242 B3 | 2/2017 |
| DE | 102019121929 A1 | 2/2021 |

(Continued)

OTHER PUBLICATIONS

"EtherCAT—the Ethernet Fieldbus," EtherCAT Technology Group, Nov. 2012, 21 pages.

(Continued)

*Primary Examiner* — Rushil P. Sampat
(74) *Attorney, Agent, or Firm* — Dorsey & Whitney LLP

(57) ABSTRACT

A network distributor has a plurality of input-output ports, a processor unit, and a memory unit. The ports connect network subscribers via a data line network, where the network subscribers include protocol subscribers to process telegrams as protocol telegrams. The processor unit receives telegrams via one port and outputs telegrams via another port, which is stored in a routing table in the memory unit. The processor unit further determines whether a telegram is a protocol telegram received via a port for which no port identifier is stored in the memory unit, and to discard the telegram if so. Checking and discarding of telegrams can be subject to a precondition, where fulfillment of the precondition leads to an exception from discarding the telegram.

15 Claims, 3 Drawing Sheets

(58) Field of Classification Search
CPC ..... H04L 69/22; H04L 47/2483; H04L 47/32; G06F 13/00
See application file for complete search history.

(56) References Cited

U.S. PATENT DOCUMENTS

| | | | |
|---|---|---|---|
| 2015/0103831 A1 | 4/2015 | Chandhoke et al. | |
| 2017/0359257 A1* | 12/2017 | Hidaka | H04L 45/306 |
| 2018/0183624 A1* | 6/2018 | Coulon | H04L 12/40143 |

FOREIGN PATENT DOCUMENTS

| | | |
|---|---|---|
| JP | 2017228887 A | 12/2017 |
| WO | 2021028186 A1 | 2/2021 |

OTHER PUBLICATIONS

International Search Report and Written Opinion dated Oct. 26, 2020 in connection with International Patent Application No. PCT/EP2020/070826, 31 pages including English translation.

International Preliminary Report on Patentability dated Jul. 26, 2021 in connection with International Patent Application No. PCT/EP2020/070826, 46 pages including English translation.

Jahanzaib, Imtiaz et al. "A Layer-2 Multicast Forwarding Policy for a Generic Real-time Ethernet System," Factory Communication Systems (WFCS), 2010 8th IEEE International Workshop, May 18, 2010, 8 pages.

Jasperneite, Jürgen et al. "A Proposal for a Generic Real-Time Ethernet System," IEEE Transactions on Industrial Informatics, vol. 5, No. 2, May 1, 2009, 11 pages.

* cited by examiner

TRANSMISSION OF TELEGRAMS BY A NETWORK DISTRIBUTOR IN AN AUTOMATION NETWORK

CROSS-REFERENCE TO RELATED APPLICATIONS

This application is a continuation of International Patent Application No. PCT/EP2020/070826, NETWORK DISTRIBUTOR, AUTOMATION NETWORK AND METHOD FOR TRANSMITTING DATA IN AN AUTOMATION NETWORK, filed 23 Jul. 2020, which claims priority to German patent application DE 10 2019 121 929.9, NETZWERKVERTEILER, AUTOMATISIERUNGSNETZWERK UND VERFAHREN ZUR DATENÜBERTRAGUNG IN EINEM AUTOMATISIERUNGSNETZWERK, filed 14 Aug. 2019, each of which is incorporated by reference herein, in the entirety and for all purposes.

FIELD

The present invention relates to a network distributor in an automation network. Furthermore, the invention relates to an automation network as well as to a method for transmitting data in the automation network.

BACKGROUND

Automation networks are frequently operated as "fieldbus systems". These are industrial bus systems that allow for real-time capable control of the machines or systems of the automation network, wherein the machines or systems of the automation network are controlled by programmable logic controllers (PLCs). The PLC uses the field-bus system for the communication of field devices, e.g. sensors and actuators of the machines or systems of the automation network, with the PLC. If a plurality of network subscribers sends telegrams via the same data line in the automation network, which may be embodied as a wired or wireless bus system, there must be a possibility for the network subscribers of sharing the same data line in order to transmit data. For this purpose, defined hierarchies and standardized protocols are provided.

In most cases, the field-bus systems operate in the so-called "master-slave mode". This means that at least one network subscriber is embodied as a master subscriber and takes over the control of the processes, while the other network subscribers, which may be embodied as protocol subscribers, take over the processing of subtasks in the control operation of the automation network as slave protocol subscribers. In the automation network, data are exchanged by telegrams that are output by the master subscriber to the slave protocol subscribers. The slave protocol subscribers read the output data addressed to them from the telegram and place their input data in the telegram and send the telegram back to the master subscriber.

The automation networks are often embodied as Ethernet-based networks or as Ethernet-based field bus. This means that the real-time capable protocol on which the telegram traffic in the automation network is based may e.g. be the EtherCAT protocol. An automation network with underlying EtherCAT protocol, hereinafter referred to as EtherCAT network for short, which is known from the prior art, comprises a direct connection between the master subscriber and the individual network subscribers or slave protocol subscribers. The master subscriber and the network subscribers or slave protocol subscribers are therefore each connected to one another via a point-to-point connection without intermediate stations, e.g. in the form of network distributors, via a data line network.

The above-mentioned programmable logic controller may be embodied as a local machine controller and may be networked with other machine controllers of other machines or systems. As a rule, the machines or systems have at least one interface for an external connection, e.g. to the Internet, and/or at least one interface to the control level. In this context, a control level refers to a central control level of the machines or systems. In other words, a central monitoring level that comprises the individual machines or systems together with their respective local controllers. The local machine controllers may therefore be connected to the control level or the Internet via a further Ethernet network.

The connection to the Internet in particular poses the risk of an unwanted hacker attack on the local machine controllers and/or the central machine controller. A remedy against such a hacker attack may be the installation of a firewall for the local machine control that comprises the master subscriber. This is sufficient because access to the slave protocol subscribers is only possible via the master subscriber.

If the EtherCAT network is extended by network distributors which may be embodied as so-called switches or branches, an external attack on a slave protocol subscriber and/or another protocol subscriber may take place via an input/output port of a network distributor, in particular if said input/output port is connected to the Internet. By such a hacker attack it may be possible that a control task or, respectively, the control operation in the EtherCAT network is manipulated. This problem may also occur with other Ethernet-based field buses, such as the PROFINET field-bus system. One possibility known in the state of the art for solving this problem is to encrypt the connection between the controller, i.e. the master subscriber, and the peripheral device, i.e. the slave protocol subscriber.

However, a disadvantage of the encryption of the connection is that the encryption of the telegrams involves time and effort. Above all, it must then be ensured that a key, by which the telegrams are e.g. encrypted by the master subscriber and decrypted by the individual slave protocol subscribers, is transmitted to the individual slave protocol subscribers via a trusted connection. Furthermore, the encryption of the telegrams leads to a time delay which may have the effect that the processing of a telegram or a section in the telegram cannot be started instantaneously, but must wait until a certain telegram length in bytes is received and then decryption may only be performed prior to the actual processing. This may be a major disadvantage, in particular for the processing of control-relevant data, e.g. process data, since short response times are essential for this.

SUMMARY

The present invention provides an improved network distributor, an improved automation network as well as an improved method for transmitting data in the automation network.

EXAMPLES

According to a first aspect, a network distributor is proposed. The network distributor comprising a plurality of input/output ports, a processor unit, and a memory unit. The plurality of input/output ports are configured to respectively connect network subscribers via a data line network. The network subscribers may comprise protocol subscribers embodied to process telegrams formed as protocol telegrams. The processor unit is embodied to receive telegrams via an input/output port and to output telegrams via another input/output port, which is stored in a routing table in the memory unit. Furthermore, the processor unit is embodied to check a telegram to determine whether the telegram is a protocol telegram and has been received via an input/output port for which it is preset that no protocol subscriber is connected, and to discard the telegram if the check is positive. Checking and discarding of the telegram may be subject to a precondition to be taken into account by the processor unit, wherein particularly the fulfillment of the precondition may lead to an exception from discarding the telegram.

According to a second aspect, an automation network comprising a plurality of network subscribers interconnected by a data line network is proposed. Network subscribers are embodied as protocol subscribers for processing telegrams that are embodied as protocol telegrams. The automation network comprises at least one network distributor comprising a plurality of input/output ports, a processor unit, and a memory unit. The plurality of input/output ports are embodied to respectively connect network subscribers via the data line network. The processor unit is embodied to receive a telegram via an input/output port and to output it via a further input/output port stored in a routing table in the memory unit. The processor unit is further embodied to check a telegram as to whether the telegram is a protocol telegram and has been received via an input/output port for which it is preset that no protocol subscriber is connected, and to discard the telegram if the check is positive. The checking and discarding of the telegram may be subject to a precondition to be considered by the processor unit, wherein in particular the fulfillment of the precondition may lead to an exception from discarding the telegram.

According to a third aspect, a method for transmitting data in an automation network is proposed. The automation network comprising a plurality of network subscribers and at least one network distributor which are interconnected via a data line network. The network subscribers may comprise protocol subscribers embodied to process telegrams embodied as protocol telegrams. The network distributor comprises a plurality of input/output ports, a processor unit, and a memory unit. The plurality of input/output ports are embodied to respectively connect network subscribers via the data line network. The processor unit receives a telegram via an input/output port and outputs it via a further input/output port stored in a routing table in the memory unit. The processor unit checks a telegram to determine whether the telegram is a protocol telegram and has been received via an input/output port for which it is preset that no protocol subscriber is connected, and discards the telegram if the check is positive. The checking and discarding of the telegram may be subject to a precondition to be considered by the processor unit, wherein in particular the fulfillment of the precondition may lead to an exception from discarding the telegram.

The proposed network distributor, automation network and method for data transmitting in said automation network provide protection against unauthorized access to the control operation of the automation network and may protect against manipulation of the local machine controllers and/or the central machine controller in that telegrams which are embodied as protocol telegrams and are received by a network subscriber which is not embodied as a protocol subscriber via an input/output port of the network distributor are discarded by the network distributor and thus blocked. In this case, the protocol subscribers comprise slave protocol subscribers as well as at least one master subscriber that is also configured as a protocol subscriber. Such a telegram is not sent to a protocol subscriber in the automation network, but is directly blocked in the network distributor. In particular, by discarding certain telegrams, it is possible to dispense entirely with the use of time-consuming encryption in order to protect the transmission of control-relevant data in the automation network from interference by third parties, for example if a network subscriber is connected to an input/output port of the network distributor, which has an Internet connection and is thus globally networked. In particular, by discarding protocol telegrams received via input/output ports of the network distributor for which it is preset that no protocol subscribers are connected, improved data protection of the control-relevant data may be provided.

The network subscribers in the automation network may be embodied as a master-slave system, i.e. a logical or hierarchical structure of the master subscriber and the slave protocol subscribers. A transmission channel is usually available for transmitting data via the data line network in the automation network. This channel must be shared by the protocol subscribers by mutual agreement. In this case, the master subscriber is the protocol subscriber that has the unsolicited access authorization to the transmission channel and may grant authorization for this to the other protocol subscribers that are configured as slave protocol subscribers. The network distributor may be embodied to distribute the telegrams, which are formed as protocol telegrams, via the data line network to the network subscribers and protocol subscribers connected via the input/output ports of the network distributor. Furthermore, the network distributor may also be embodied to discard or block certain protocol telegrams as described above. The slave protocol subscribers may be embodied to each communicate securely with the master subscriber via protocol telegrams.

In a further embodiment, the processor unit is embodied to use a port identifier in the memory unit to check whether the network subscriber connected via the input/output port of the network distributor that sent the telegram is embodied as a protocol subscriber. A port identifier is stored in the memory unit if the network subscriber connected via the input/output port is embodied as a protocol subscriber. A simple and inexpensive way to distinguish the network subscribers connected via the individual input/output ports of the network distributor is to use the port identifier for the individual input/output ports of the network distributor. Also, the port identifier may provide an improved network structure and contribute to simplified maintenance of the automation network and improve data protection in the automation network.

In further embodiment, the processor unit is configured to check whether the protocol telegram received via the input/output port has a telegram identifier. The processor unit is further embodied to recognize the telegram as a protocol telegram based on the telegram identifier.

A telegram may be formed as a protocol telegram having a particular field bus protocol, e.g. the particular field bus protocol may be the real-time capable EtherCAT protocol. However, the specific field bus protocol may also differ from the EtherCAT protocol and be in the form of another field bus protocol, e.g. in the form of the PROFINET standard (PROFINET: Process Field Network). For the PROFINET standard, a separate Ether type value is used in a protocol field of the telegram, which has the value 0x8892 in hexadecimal system. In addition, the UDP protocol assigned to the transport layer of the OSI layer model (OSI: Open Systems Interconnection) is used for the PROFINET standard (UDP: User Datagram Protocol). The OSI model is a reference model for protocols in the form of a layered architecture, with the transport layer corresponding to the fourth layer. In both cases mentioned, the telegram identifier may be used to identify the protocol telegrams and may be embodied differently for the EtherCAT protocol than for the PROFINET standard or for another field bus protocol.

In particular, the proposed method may be flexibly embodied to the requirements of the automation network and the network distributor, and the individual method steps may be varied, e.g. checking whether the telegram has a telegram identifier or checking whether a port identifier for a protocol subscriber connected via an input/output port of the network distributor is stored in the memory unit. If the presence of the telegram identifier is verified, it may be determined instantaneously whether it is a protocol telegram, i.e. a control-relevant telegram, or not. If the port identifier is checked first, it may be determined instantaneously whether network subscribers that are not protocol subscribers are connected via the respective input/output port.

In a further embodiment, a telegram embodied as a protocol telegram is embodied as an Ethernet telegram. The Ethernet telegram comprises an Ethernet header section and an Ethernet data section. The telegram identifier comprises a first identifier and a second identifier, wherein the Ethernet header section comprises the first identifier of the telegram identifier. The processing unit is embodied to evaluate the first identifier of the telegram identifier in the Ethernet header section. If the protocol telegram is formed as an Ethernet telegram, the proven Ethernet technology with the data frame structure specified according to the IEEE 802.3 standard may be used for an Ethernet data packet. For example, the first identifier of the telegram identifier may be formed as an Ethernet type value in the protocol field mentioned above and have the value 0x88A4 in the hexadecimal system for an EtherCAT protocol telegram or the value 0x0800 for the IP protocol (IP: Internet Protocol), provided that the EtherCAT protocol telegram is embedded in a UDP/IP data frame. Protocol telegrams with field bus protocols deviating from this consequently have a different Ether type value. For example 0x8892 in the hexadecimal system for the PROFINET protocol (PROFINET: Process Field Network). The ethertype value provides information about the used protocol of the next higher layer within the user data, i.e. within the Ethernet data section, wherein a layer and a next higher layer are defined according to the OSI model.

In a further embodiment, a telegram formed as a protocol telegram is formed as an Ethernet telegram. The Ethernet telegram comprises an Ethernet header section and an Ethernet data section, wherein the Ethernet data section comprises a field bus protocol header section. The telegram identifier comprises a first identifier and a second identifier. The Ethernet header section comprises the first identifier of the telegram identifier, and the field bus protocol header section comprises the second identifier of the telegram identifier. The processing unit is embodied to evaluate the first identifier of the telegram identifier in the Ethernet header section and the second identifier of the telegram identifier in the field bus protocol header section. The known Ethernet standard may be used for the proposed network distributor and the proposed method.

If the field bus protocol header is embodied as an EtherCAT header, the proven real-time capable EtherCAT standard may in particular be used. Here, the first identifier of the telegram identifier may e.g. be embodied as an Ethernet type value in the Ethernet header section similar to the explanation above. The second identifier of the telegram identifier in the field bus protocol header section may e.g., if the EtherCAT field bus protocol is used, be formed as an EtherCAT protocol type value in the type field. With the value 0x1 in the hexadecimal system with underlying EtherCAT field bus protocol it may be indicated to the processing unit of a slave protocol subscriber that the processing unit may process the protocol telegram which may be formed as EtherCAT protocol telegram. Thus, the second identifier of the telegram identifier may have a field bus protocol value that identifies the respective field bus protocol. In addition, the first and the second identifier of the telegram identifier may have a different Ether type value and a different field bus protocol value for an alternatively used other field bus protocol.

It is proposed that the precondition under which a check and discard of a telegram is set comprises a determination whether the address of the telegram corresponds to a predetermined address. The telegrams, which may be formed as protocol telegrams, from a network subscriber which is not formed as a protocol subscriber are thus not exclusively discarded by the processor unit of the network distributor, but may also be classified as trustworthy by determining the correspondence of the address of a protocol telegram and the predetermined address of a protocol subscriber and forwarded to the respective recipient by the processor unit. Here it is conceivable that the master subscriber specifies the address to the processor unit of the network distributor and stores it, e.g. in a memory unit of the network distributor. The specified address may e.g. be the MAC address (MAC: Media Access Control) of the sender, i.e. the sender address. A different embodiment of the specified address of the sender via VLAN IDs (VLAN: Virtual Local Area Network) or segment addresses for EtherCAT segments is conceivable, as well.

In a further embodiment, the automation network is embodied as a master-slave system. One protocol subscriber of the automation network is embodied as the master subscriber which is embodied to output telegrams configured as protocol telegrams via the data line network. The slave protocol subscribers are embodied to process the protocol telegrams. The master subscriber is further embodied to set in the processor unit of the network distributor that no protocol subscriber is connected to an input/output port of the network distributor. Due to the defined hierarchy in the automation network, a transparent network structure may be achieved in which the master subscriber may be embodied to set the processor unit of the network distributor and to set the slave protocol subscribers.

In a further embodiment, the master subscriber is embodied to predefine a network structure of the network subscribers and to transmit the predefined network structure to the processor unit of the network distributor via the data line network. The processor unit is embodied to indicate the input/output ports of the network distributor to which protocol subscribers are connected via the data line network with the port identifier in the memory unit based on the predetermined network structure. If the master subscriber provides the network distributor with the network structure with the network subscribers connected via the input/output ports, this may advantageously save time and effort, since the processor unit may immediately create the port identifier for the input/output ports of the network distributor and store it in its memory unit.

In a further embodiment, the master subscriber is embodied to detect a network structure of the network subscribers by query telegrams. If a network subscriber, which is embodied as a protocol subscriber, receives a query telegram, the protocol subscriber is embodied to enter protocol subscriber information into the query telegram and to send the query telegram back to the master subscriber, provided that no subsequent protocol subscriber is connected via the data line network. If the network distributor receives a query telegram via the input/output port, the network distributor is embodied to enter port information into the query telegram and to send the query telegram back to the master subscriber. The master subscriber is embodied to output further query telegrams to the network distributor based on the port information. The processor unit of the network distributor forwards the further query telegrams to the network subscriber connected via the data line network via the further input/output port stored for the respective query telegram in the routing table in the memory unit.

The master subscriber is embodied to communicate, based on the protocol subscriber information of the received further query telegrams, to the processor unit of the network distributor, which of the plurality of input/output ports of the network distributor protocol subscribers are connected to via the data line network. The processor unit is embodied to identify the input/output ports of the network distributor to which a protocol subscriber is connected via the data line network with the port identifier in the memory unit. Dynamic detection of the network structure by the master subscriber makes it possible to achieve a high degree of flexibility with regard to the embodiment and configuration of the automation network together with its network subscribers.

The advantageous embodiments and further developments of the invention explained above and/or indicated in the subclaims may be used individually or in any combination with one another—except, for example, in cases of clear dependencies or incompatible alternatives.

BRIEF DESCRIPTION OF THE DRAWINGS

The above-described features, characteristics and advantages of the present invention, as well as the manner in which they are achieved, will become clearer and more clearly understood in connection with the following description of embodiments, which will be explained in more detail in connection with the schematic drawings, in which.

Figure 1:
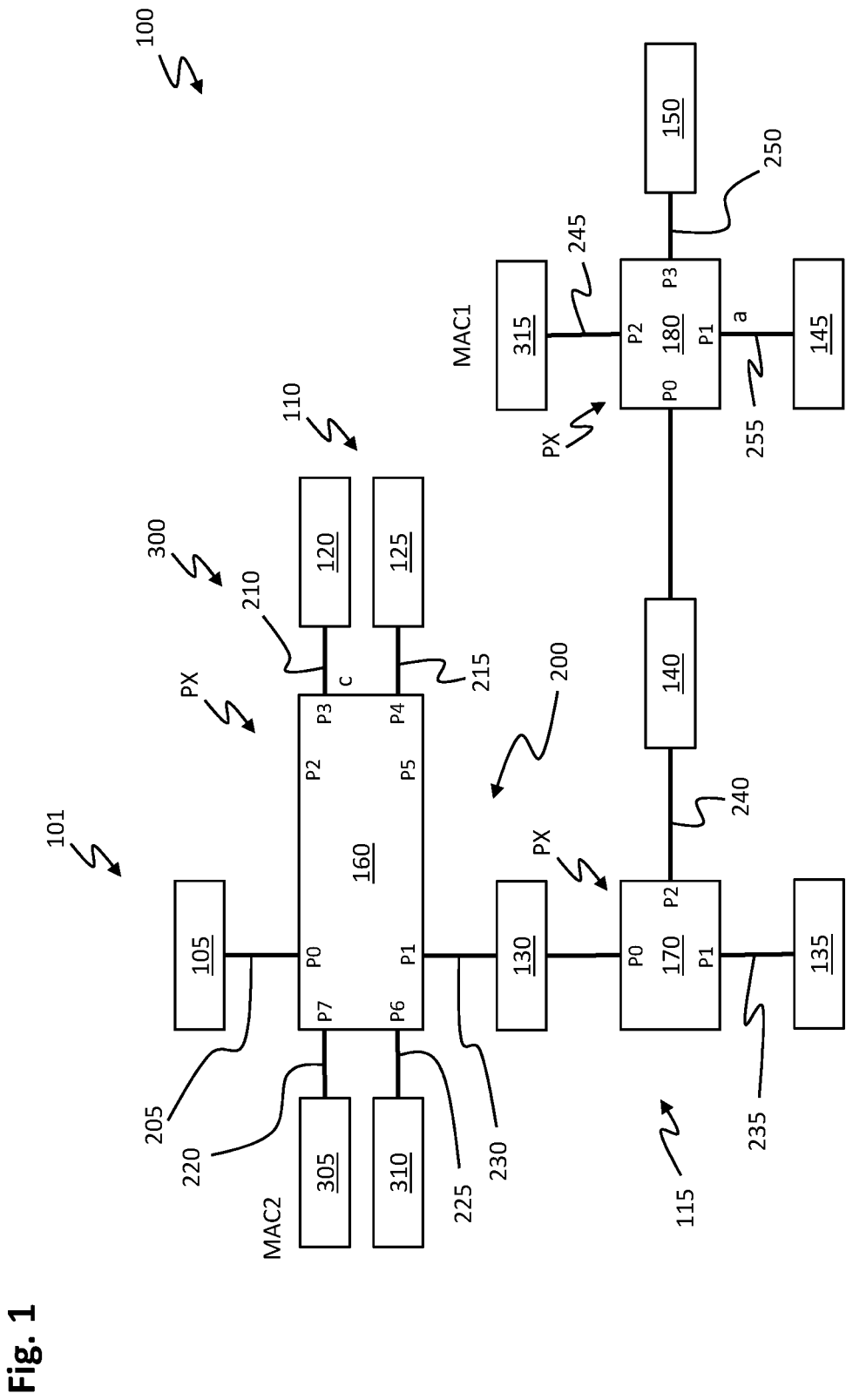
FIG. 1 shows a schematic structure of an automation network comprising network subscribers.

It should be noted that the figures are merely schematic in nature and not to scale. In this sense, components and elements shown in the figures may be exaggeratedly large or reduced in size for better understanding. Furthermore, it is pointed out that the reference numerals in the figures remain unchanged if the elements and/or components are of the same embodiment.

DETAILED DESCRIPTION

Automation networks 100 are usually implemented as field-bus systems in which the network subscribers 300 are interconnected via the field bus. The automation network 100 may have a master subscriber 105 and at least one network distributor 115. The network distributor 115 may be embodied to send telegrams which may be in the form of protocol telegrams and are output by the master subscriber 105 as protocol subscriber 101 via a data line network 200, to the network subscribers 300 connected via the individual input/output ports PX, which may comprise protocol subscribers 101 formed as slave protocol subscribers 110, via the data line network 200. Said network subscribers 300 or protocol subscribers 101 may be embodied to exchange data with control units, typically using real-time capable protocols such as the EtherCAT protocol. The automation network 100 may be embodied as a master-slave system. The proposed automation network 100, network distributor 115 and method for transmitting data are described below by way of example using the real-time capable EtherCAT protocol and are not limited to a master-slave hierarchy.

In the following, the term "on the fly" is understood to mean that a processing unit of a slave protocol subscriber 110 is embodied to start processing a protocol telegram before the protocol telegram has been completely received via the input port of a slave protocol subscriber 110. If in the following the processing of a protocol telegram in a run is mentioned, this comprises the reading of the output data addressed to the respective slave protocol subscriber 110, as well as the insertion of input data into the protocol telegram and the forwarding of the protocol telegram to the subsequent slave protocol subscriber 110.

In the following, a protocol telegram is understood to be a telegram via which the master subscriber 105 as protocol subscriber 101 communicates with the slave protocol subscribers 110 as protocol subscribers 101 in order to exchange control-relevant data. Preferably, the protocol telegram is embodied as an EtherCAT protocol telegram. The slave protocol subscribers 110 do not send protocol telegrams independently. However, network subscribers 300 that are not slave protocol subscribers 110 may independently send protocol telegrams to protocol subscribers 101. The master subscriber 105 may communicate with other network subscribers 300 via differently embodied telegrams, e.g. via Ethernet telegrams or telegrams with underlying OPC-UA protocol (OPC-UA: Open Platform Communications-Unified Architecture). In particular, network subscribers 300 may communicate with protocol subscribers 101 via the OPC-UA protocol.

In the following, the term discarding of a protocol telegram shall be able to be equated with blocking a protocol telegram for forwarding via a further input/output port PX of the network distributor 115, so that the protocol telegram cannot reach the network distributor 115 via the data line network 200 within the automation network 100 and cannot reach the recipient, which may be the master subscriber 105 and/or a slave protocol subscriber 110, i.e. a protocol subscriber 101.

The main idea is to provide a network distributor 115 that selectively blocks telegrams identified as protocol telegrams and received via an input/output port PX of the network distributor 115 for which it is preset that no protocol subscriber 101 is connected. In this case, the checking discarding of the telegrams may be subject to a precondition to be taken into account. The blocking of protocol telegrams may thereby be extended to any number of input/output ports PX of the network distributor 115, if network subscribers 300 are connected to a plurality of input/output ports PX via the data line network 200, which are not protocol subscribers 101. The precondition under which the checking and discarding of telegrams may be set results in telegrams or protocol telegrams being exempted from being blocked or discarded, provided that the precondition is fulfilled.

The proposed automation network 100, network distributor 115 and method for transmitting data are not limited to the use of real-time capable EtherCAT protocol telegrams, even though these are the preferred protocol telegrams, but may be used in all automation networks 100 in which the master subscriber 105 may communicate with slave protocol subscribers 110 via telegrams of a specific protocol and network subscribers 300 exchange data or information with slave protocol subscribers 110 and/or the master subscriber 105 via telegrams of another protocol.

The structure and functionality of the automation network 100 and the network distributor 115 are described below with reference to FIGS. 1 to 3, with the associated reference numerals from the three figures being used in the description where useful and necessary.

FIG. 1 shows a schematic structure of an automation network 100 with network subscribers 300, said automation network 100 being embodied for a method of data transmission in the automation network 100. The automation network 100 comprises a plurality of network subscribers 300, which are interconnected via a data line network 200. The automation network 100 has protocol subscribers 101, wherein the master subscriber 105 and slave protocol subscribers 110 are formed as protocol subscribers 101. The automation network 100 is embodied as a master-slave structure. The master-slave structure thereby images the access hierarchy to the data line network 200, i.e. the master subscriber 105 has access authorization to the data line network 200 and may grant access to the slave protocol subscribers 110 in the automation network 100.

The master subscriber 105 is connected to a first input/output port P0 of a first network distributor 160 via a first data line 205. The first network distributor 160 comprises a plurality of input/output ports PX, wherein the X in the reference sign of the input/output ports PX is used as an index for a respective input/output port PX, e.g. for the first to eighth input/output ports P0 to P7 in the first network distributor 160. The first network distributor 160 may be connected to a first protocol subscriber 120 via a fourth input/output port P3 over a second data line 210. The master subscriber 105 may be configured to perform a central configuration of the automation network 100 including the individual slave protocol subscribers 110. The first protocol subscriber 120 may be embodied as a slave protocol subscriber 110 and may comprise a processing unit. The processing unit of the first protocol subscriber 120 may be configured to process telegrams output as protocol telegrams from the master subscriber 105 on the fly. For example, the first protocol subscriber 120 may be embodied as a coupler element EK1100 manufactured by Beckhoff Automation GmbH & Co. KG, wherein further slave protocol subscribers 110 may be connected to the coupler element EK110. For better clarity, FIG. 1 only shows the input/output ports PX of the network distributors 115 are shown in FIG. 1. Nevertheless, the other network subscribers 300 including the protocol subscribers 101 in the automation network 100 have input/output ports PX via which the network subscribers 300 and protocol subscribers 101 are interconnected via the data line network 200. In the following, this aspect will not be discussed any further.

The first network distributor 160 may be connected to a second protocol subscriber 125 via a fifth input/output port P4 of the first network distributor 160 and via a third data line 215. For example, the second protocol subscriber 125 may be formed as a coupler element. The coupler element, too, may be used to connect additional protocol subscribers, which may be slave protocol subscribers 110. Like the first protocol subscriber 120, the second protocol subscriber 125 may also be embodied as a slave protocol subscriber 110. For example, no network subscriber 300 is connected via a data line by a third input/output port P2 and by a sixth input/output port P5 of the first network distributor 160, respectively. However, network subscribers 300 and/or protocol subscribers 101 may in principle be connected via the third input/output port P2 as well as via the sixth input/output port P5 of the first network distributor 160.

Further, the first network distributor 160 may be connected to a first network subscriber 305 via an eighth input/output port P7 and via a fourth data line 220. The first network subscriber 305 may e.g. be configured as an Ethernet subscriber. In particular, the first network subscriber 305 may be configured to independently send telegrams, which may also be embodied as protocol telegrams, to the eighth input/output port P7 of the first network distributor 160 in the automation network 100 via the fourth data line 220. In comparison, slave protocol subscribers 110 merely place data or information into a protocol telegram from the master subscriber 105, or extract data or information from the protocol telegram. Active independent sending of protocol telegrams is not performed by slave protocol subscribers 110, but generally only by the master subscriber 105.

The first network distributor 160 may be connected to a second network subscriber 310 via a seventh input/output port P6 and via a fifth data line 225. The second network subscriber 310 may be embodied similarly to the first network subscriber 305. For example, the second network subscriber 310 may also be embodied as an Ethernet subscriber and may be configured to independently send telegrams, which may also be configured as protocol telegrams, to the seventh input/output port P6 of the first network distributor 160 via the fifth data line 225. The first network distributor 160 is further connected to a third protocol subscriber 130 via a second input/output port P1 and a sixth data line 230, and to the second network distributor 170 via a first input/output port P0 of a second network distributor 170. The third protocol subscriber 130 may be similar to the first protocol subscriber 120 and the second protocol subscriber 125 as a slave protocol subscriber 110. Unlike the first protocol subscriber 120 and the second protocol subscriber 125, the third protocol subscriber 130 may e.g. not be embodied as a coupler element to which further slave protocol subscribers 110 may be connected, but the third protocol subscriber 130 may be embodied as a single slave protocol subscriber 110. The second network distributor 170 may have a plurality of input/output ports PX, in the embodiment example shown in FIG. 1 three input/output ports PX, namely first to third input/output ports P0 to P2.

A second input/output port P1 and a seventh data line 235 may connect the second network distributor 170 to a fourth protocol subscriber 135. The fourth protocol subscriber 135 may be similar to the second protocol subscriber 125 in that it is a slave protocol subscriber 110 and a coupler element. No repetition of the above features is provided for the fourth protocol subscriber 135. The second network distributor 170 may be connected to a fifth protocol subscriber 140 via a third input/output port P2 and an eighth data line 240, and to the third network distributor 180 via a first input/output port P0 of a third network distributor 180. The fifth protocol subscriber 140 may be similar to the third protocol subscriber 130 in that it is a slave protocol subscriber 110 for processing protocol telegrams on the fly. The third network distributor 180 may also have a plurality of input/output ports PX, in the embodiment example shown in FIG. 1 four input/output ports PX, namely first to fourth input/output ports P0 to P3. A second input/output port P1 and an eleventh data line 255 connect the third network distributor 180 to a sixth protocol subscriber 145. The sixth protocol subscriber 145 may be similar to the second protocol subscriber 125 and similar to the fourth protocol subscriber 135 as a slave protocol subscriber 110 for processing protocol telegrams in transit and as a coupler element.

The third network distributor 180 is connected to a seventh protocol subscriber 150 via a fourth input/output port P3 and via a tenth data line 250. Similar to the third protocol subscriber 130 and similar to the fifth protocol subscriber 140, the seventh protocol subscriber 150 may be a slave protocol subscriber 110 for processing protocol telegrams on the fly. The third network distributor 180 is connected to a third network subscriber 315 via a third input/output port P2 and via a ninth data line 245. The third network subscriber 315 may be formed as an Ethernet subscriber similar to the first network subscriber 305 and similar to the second network subscriber 310. For example, the third network subscriber 315 may be formed as an Ethernet switch.

As an Ethernet switch, the third network subscriber 315 may be different from the first through third network distributors 160, 170, 180. The first to third network distributors 160, 170, 180 may each comprise a processor unit 400 that enables the first to third network distributors 160, 170, 180 to process protocol telegrams on the fly like a slave protocol subscriber 110, in particular if the protocol telegrams are real-time capable EtherCAT telegrams. The third network subscriber 315 does not have this functionality as an Ethernet switch. However, the third network subscriber 315 may be embodied in the same way as the first network subscriber 305 and the second network subscriber 310 to independently send telegrams, which may also include protocol telegrams, to the third input/output port P2 of the third network distributor 180 via the ninth data line 245.

In an automation network 100 in which the telegram traffic is based on the EtherCAT standard, hereinafter referred to as EtherCAT network, the first network distributor 160, the second network distributor 170 and the third network distributor 180 may particularly be embodied as a so-called "branch" or "switch" and, as mentioned above, for processing protocol telegrams. The network structure of the network subscribers 300, the master subscriber 105 and the slave protocol subscribers 110 as well as the network distributors 115 of the automation network 100 has been chosen by way of example and does not limit said components thereto. Also, the automation network 100 in FIG. 1 could have further network subscribers 300. These could be further slave protocol subscribers 110 and/or one or a plurality of network distributors 115, wherein slave protocol subscribers 110 may be connected to the plurality of input/output ports PX of the one or more network distributors 115 via further data lines.

In the following, the features of the automation network 100 including the network subscribers 300, the protocol subscribers 101 and, in particular, the structure and operation of the network distributors 115 are explained with reference to FIG. 1 and FIG. 2.

Figure 2:
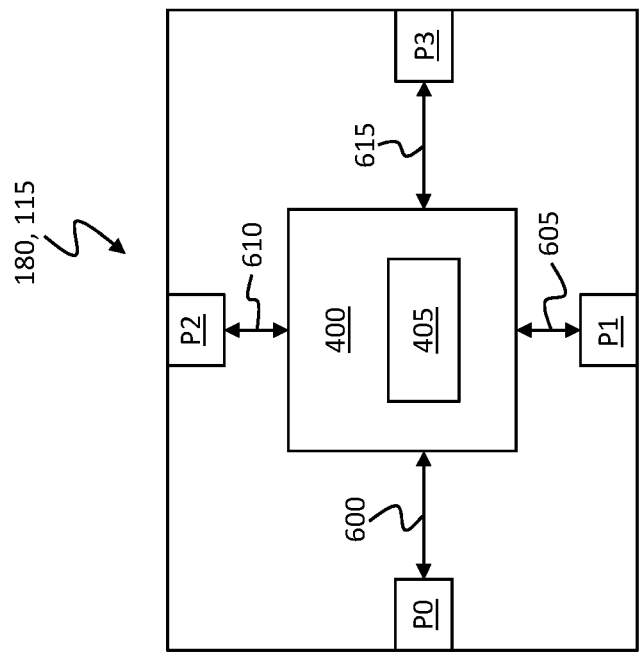
FIG. 2 a schematic diagram of a network distributor.

The network structure may be predetermined by the master subscriber 105 and the individual network subscribers 300 connected to the plurality of input/output ports PX of at least one network distributor 115 via the data line network 200, which may include slave protocol subscribers 110, may be transmitted to a processor unit 400 of the at least one network distributor 115 shown in FIG. 2. The processor unit 400 may be embodied to indicate the input/output ports PX of the network distributor 115 to which protocol subscribers 101 are connected via the data line network 200 with a port identifier in a memory unit 405 of the network distributor 115 shown in FIG. 2, based on the predetermined network structure. The memory unit 405 may e.g. comprise a port table comprising the port identifiers of the input/output ports PX. Moreover, it is also conceivable that a routing table in the memory unit 405 comprises the port identifiers. The port identifiers may be in the form of values or symbols, and may be used to identify the input/output ports PX of the network distributor 115 to which protocol subscribers 101 are connected. Alternatively, the port identifiers may be embodied to identify all input/output ports PX of the network distributor 115, e.g. via a variable having two states, wherein one state indicates that a protocol subscriber 101 is connected via the input/output port and the other state of the variable may be used to express that a network subscriber 300 is connected via the respective input/output port.

In an alternative, the master subscriber 105 may be embodied to detect the network structure of the network subscribers 300 in the automation network 100 by query telegrams. This alternative is particularly conceivable prior to the first configuration of the network distributors 115 and the protocol subscribers 101, wherein the query telegrams may also be embodied as EtherCAT telegrams like the protocol telegrams. If a network subscriber 300, which is formed as a protocol subscriber 101, receives a query telegram, the protocol subscriber 101 is configured to enter protocol subscriber information into the query telegram and to return the query telegram to the master subscriber 105 via the data line network 200, provided that no subsequent protocol subscriber 101 is connected via the data line network 200, which may be formed as a slave protocol subscriber 110. If a subsequent protocol subscriber 101 is connected via the data line network 200, the preceding protocol subscriber 101, which may also be embodied as a slave protocol subscriber 110, sends the query telegram to the subsequent protocol subscriber 101, and the last protocol subscriber 101 in a chain of protocol subscribers 101 sends the query telegram back to the master subscriber 105. The protocol subscriber information may be a value, symbol, or the like that uniquely identifies to the master subscriber 105 that the network subscriber 300 is a protocol subscriber 101. Also, the protocol subscriber information may provide an indication of what data transmission rate or symbol rate the protocol subscriber 101 is embodied for.

If the network distributor 115 receives a query telegram via the first input/output port P0, the network distributor 115 is configured to enter port information into the query telegram and to send the query telegram back to the master subscriber 105. Like the protocol subscriber information, the port information may be in the form of a value, a symbol, or the like, and may provide the master subscriber 105 with information about the input/output ports PX of the network distributor 115 to which network subscribers 300 are connected via the data line network 200. Also, the port information may indicate for which data transmission rate or symbol rate the respective input/output port PX is embodied. Based on the port information, the master subscriber 105 is embodied to output further query telegrams to the network distributor 115, which the processor unit 400 of the network distributor 115 forwards to the network subscriber 300 connected via the data line network 200 via the input/output port PX stored with regard to the respective query telegram in the routing table in the memory unit 405. The master subscriber 105 is embodied to transmit, based on the protocol subscriber information of the received further query telegrams, to the processor unit 400 of the network distributor 115 which of the plurality of input/output ports PX of the network distributor 115 protocol subscribers 101 are connected to via the data line network 200. The processor unit is embodied to identify the input/output ports PX of the network distributor 115 to which a protocol subscriber 101 is connected via the data line network 200 with the port identifier in the memory unit 405.

Furthermore, the master subscriber 105 is embodied to set in the processor unit 400 of the network distributor 115 of FIG. 2 that the processor unit 400 of the network distributor 115 checks a telegram as to whether the telegram is a protocol telegram and has been received via an input/output port PX of the network distributor 115 for which it is preset that no protocol subscriber 101 is connected. If the check result is positive, the processor unit 400 of the network distribution unit 115 is embodied to discard the telegram. In particular, the master subscriber 105 may configure the processor unit 400 such that the processor unit 400 has to take into account a precondition under which the checking and discarding of the telegram may be set by the master subscriber 105. The precondition under which the checking and discarding of a telegram is set comprises a determination by the processor unit 400 whether the address of the telegram corresponds to a predetermined address. If the address of the telegram corresponds to a predetermined address, e.g. a predetermined sender address, the processor unit 400 may be embodied not to discard the telegram as part of the checking process, given the predetermined condition set by the master subscriber 105.

The address may be embodied as a sender address in the form of a MAC address (MAC: Media Access Control), a VLAN ID (VLAN: Virtual Local Area Network) or as a segment address for an EtherCAT segment with one or a plurality of protocol subscribers. It is conceivable that the master subscriber 105 transmits the address classified as trustworthy to the processor unit 400 of the network distributor 115 in the form of a sender address of a protocol telegram that is not sent by any protocol subscriber to an input/output port PX of the network distributor 115. The processor unit 400 may then forward the protocol telegram, provided that the address corresponds to the predetermined address, i.e., the precondition under which the checking and discarding of a telegram is set, to the respective protocol subscriber 101 via the input/output port PX stored for the respective protocol subscriber 101 in the routing table via the data line network 200.

Furthermore, it is conceivable that the precondition under which the checking and discarding of a telegram may be set by the master subscriber 105 may also be implemented in an alternative manner. If the automation network 100 comprises further master subscribers connected via input/output ports PX of the network distributor 115, the processor unit 400 may in an alternative embodiment of the precondition be configured to determine whether further master subscribers are connected via the input/output ports PX of the network distributor 115. If no telegrams, which may be in the form of protocol telegrams, are to be received from the further master subscribers by the network distributor 115 via an input/output port PX, the precondition may be in the form of discarding the telegrams of the further master subscribers instead of an exception from discarding the telegrams.

In particular, the master subscriber 105 sets the processor unit 400 of the network distributor 115 to discard the telegram in case of a positive check, i.e. in case the telegram is a protocol telegram and has been received via an input/output port PX for which it is preset that no protocol subscriber 101 is connected. The processor unit 400 may be embodied, in the case of the default setting that no protocol subscriber 101 is connected to an input/output port of the network distributor, to check whether no port identifier for the input/output port PX of the network distributor 115 is stored in the memory unit 405. The port identifier is then stored in the memory unit 405 if the network subscriber 300 connected via the input/output port PX of the network distributor 115 is a protocol subscriber 101. Furthermore, in the context the protocol unit 400 of the network distributor 115 may be embodied to check whether the protocol telegram received via the input/output port PX has a telegram identifier, since the processor unit 400 may recognize a protocol telegram based on the telegram identifier.

FIG. 2 shows a schematic structure of the network distributor 115 in the automation network 100 of FIG. 1. For explanatory purposes, the illustration of the third network distributor 180 has been chosen as an example. However, there is no limitation thereto. The first network distributor 160 as well as the second network distributor 170 may each be embodied to discard protocol telegrams received via input/output ports PX to which no protocol subscribers 101 are connected via the data line network 200, as well, in order to protect the automation network 100 from unauthorized access and manipulation. In this context, the checking and discarding of a telegram may be subject to a precondition as described above, wherein the fulfillment of the precondition (correspondence of the address of the telegram with the predetermined address) also results in the network distributor 115, i.e. the processor unit 400 of the network distributor 115, not discarding a protocol telegram that has not been received by any protocol subscriber 101 via an input/output port, but forwarding it to the recipient.

The third network distributor 180 comprises the first input/output port P0, via which the third network distributor 180 is connected to the fifth protocol subscriber 140 in the automation network 100 in FIG. 1 via the eighth data line 240. Through the first input/output port P0, the third network distributor 180 receives protocol telegrams that are output by the master subscriber 105. The first input/output port P0 is connected to the processor unit 400 using a first interaction line 600. The first interaction line 600 is formed as a double arrow, and indicates in a simplified manner that bidirectional communication or access is possible between the first input/output port P0 and the processor unit 400, wherein the access primarily relates to the routing table in the memory unit 405 and the port identifiers stored in the memory unit 405. In addition, one or more predetermined addresses, which may be sender addresses, may be stored in the memory unit 405 for checking the precondition under which the checking and discarding of a telegram may be placed. The aforementioned features for the first interaction line 600 also apply to the subsequent interaction lines. The processor unit 400 further comprises the memory unit 405, which is also selected by way of example. The memory unit 405 may be realized as a FIFO memory (FIFO: First In First Out) as a separate unit accessed by the processor unit 400. The processor unit 400 may be realized as a hardware module in the form of a processor chip or as a software module or as a combined hardware and software module. It is also conceivable that a module comprises a plurality of separate units. In the automation network 100 embodied as an EtherCAT network, the processor unit 400 is preferably embodied as an EtherCAT slave controller.

Via a second interaction line 605, the processor unit 400 is connected to the second input/output port P1, through which the third network distributor 180 is in communication with the sixth protocol subscriber 145 via the eleventh data line 255. The processor unit 400 is further connected to the third input/output port P2 via a third interaction line 610. Via the third input/output port P2, the third network distributor 180 is in communication with the third network subscriber 315 using the ninth data line 245. The third network subscriber 315 is not a protocol subscriber 101. Furthermore, the processor unit 400 is connected to the fourth input/output port P3 via a fourth interaction line 615. The third network distributor 180 is in communication with the seventh protocol subscriber 150 via the fourth input/output port P3 using the tenth data line 250.

The third network distributor 180 may comprise further components, such as a routing unit that handles the routing of the telegrams, which may also be in the form of protocol telegrams. The routing unit may access the routing table in the memory unit 405 for this purpose. The processor unit 400 may further comprise a separate processing unit for processing the protocol telegrams on the fly, provided that the third network distributor 180 is embodied as a slave protocol subscriber 110 for the first input/output port P0 and for the second input/output port P1. The above-mentioned features apply to the first network distributor 160 and the second network distributor 170 as well.

The third network subscriber 315 may e.g. have a connection to the Internet and thus represent a potential danger for external hacker attacks on the automation network 100. It is also conceivable that the third network subscriber 315 is connected to a control level, wherein a control level refers to a central monitoring level that comprises the individual machines or systems together with their respective local controllers. This is because the local machine controllers may be connected to the control level or the Internet via another Ethernet network. The aforementioned features apply equally to the first network subscriber 305 as well as to the second network subscriber 310. For example, the third network subscriber 315 may generate a protocol telegram, which is formed as an EtherCAT telegram, and send it to the third input/output port P2 of the third network distributor 180 via the ninth data line 245. As sender address, the EtherCAT protocol telegram may e.g. have the first sender address MAC1, in the form of a MAC address, i.e. the address of the sender, the third network subscriber 315. As a target address, the EtherCAT protocol telegram may e.g. have the first segment address a in FIG. 1, by which the sixth protocol subscriber 145 is to be addressed. The routing table in the memory unit 405 then stores that the processor unit 400 outputs a protocol telegram with the target address, the first segment address a, to the sixth protocol subscriber 145 via the second input/output port P1 via the eleventh data line 255.

The processor unit 400 of the third network distributor 180 is first embodied to take into account the precondition under which the checking and discarding of the telegram is set, in that the processor unit 400 compares a predetermined address e.g. stored in the memory unit 405 of the third network distributor 180 with the address of the EtherCAT protocol telegram, wherein both the predetermined address and the address of the EtherCAT protocol telegram may each be embodied as sender addresses. In particular, the predetermined address may be in the form of a sender address to identify a trusted sender in the memory unit 405 of the third network distributor 180. For example, the first sender address MAC1, i.e., the address of the third network subscriber 315 as sender of the EtherCAT protocol telegram is not stored in the memory unit 405 as a predetermined address. Thus, the precondition under which the checking and discarding of a protocol telegram is set cannot be satisfied because there is no match between the predetermined address and the address of the EtherCAT protocol telegram. The processor unit 400 would e.g. exclude the EtherCAT protocol telegram received by the third network distributor 180 via the third input/output port P2 from the third network subscriber 315 from the process of discarding if the precondition is fulfilled.

Accordingly, the processor unit 400 of the network distribution unit 115 is further configured to use the port identifier in the memory unit 405 of the third network distribution unit 180 to check whether the third network subscriber 315 connected via the third input/output port P2 of the third network distribution unit 180, from which the protocol telegram originates, is configured as a protocol subscriber 101. Since the third network subscriber 315 is not formed as protocol subscriber 101, no port identifier for the third input/output port P2 is stored in the memory unit 405.

Additionally, the protocol unit 400 checks whether the protocol telegram received via the third input/output port P2 has a telegram identifier. The telegram identifier may include a first identifier and a second identifier. The first identifier of the telegram identifier may be located in a protocol field 570 (see FIG. 3) in an Ethernet header section 505 of the protocol telegram and may be formed as an Ethernet type value 0x88A4 in the hexadecimal system for the real-time capable EtherCAT protocol. The second identifier of the telegram identifier may be located in a type field 585 in a field bus protocol header section 525 within an Ethernet data section 510 and may e.g. be formed as an EtherCAT protocol type with the value 0x1 in the hexadecimal system, the field bus protocol header section 525 then being formed in the form of an EtherCAT header section. The EtherCAT protocol type with the value 0x1 indicates to the processing unit of the protocol subscriber 110 an enable for processing the protocol telegram on the fly. Alternatively, the telegram identifier may only comprise the first identifier in the Ethernet header section 505. Alternatively, the field bus protocol header section 525 may be in the form of a header section different from the EtherCAT header section if the protocol telegrams are based on a different field bus protocol. Then the second identifier of the telegram identifier may be formed in the form of a different type value and/or of a different type field and the first identifier of the telegram identifier may be embodied as a different Ether type value in the protocol field 570.

The protocol telegram sent by the third network subscriber 315 e.g. comprises the first identifier of the telegram identifier in the Ethernet header section 505 and the second identifier of the telegram identifier in the EtherCAT header section 525, so that the processor unit 400 may evaluate the first identifier of the telegram identifier and the second identifier of the telegram identifier and may recognize the protocol telegram as such as an EtherCAT protocol telegram on the basis of the evaluation. Since the address of the third network subscriber 315 as the sender is not stored as a predetermined address in the memory unit 405 and the third network subscriber 315 is not formed as a protocol subscriber 101, since no port identifier is stored in the memory unit 405 of the third network distributor 180, and the telegram could be identified as an EtherCAT protocol telegram by the processor unit 400 of the third network distributor 180 based on the first and second identifier of the telegram identifier, the processor unit 400 is embodied to discard the EtherCAT protocol telegram received via the third input/output port P2 of the third network distributor 180.

In the configuration phase of the automation network 100, the master subscriber 105 may set the processor unit 400 of the third network distributor 180 to check and, if necessary, discard protocol telegrams that are not received from any protocol subscriber 101 via the third input/output port P2. In addition, the master subscriber 105 may e.g. store the second sender address MAC2 of the first network subscriber 305 as a predetermined address in the memory unit of the first network distributor 160, in order to classify the first network subscriber 305 as a trusted network subscriber 300. The second sender address MAC2 may be similar to the first sender address MAC1 as a MAC address. Furthermore, the master subscriber 105 may store the second segment address c in the memory unit of the first network distributor 160, which may be used by the first network distributor 160 to address the first protocol subscriber 120 via the fourth input/output port P3 and the second data line 210.

A protocol telegram with the second segment address c as target address and the predetermined address, the second sender address of the first network subscriber 305, which is received by the first network distributor 160 via the eighth input/output port P7, is not discarded by the processor unit 400 after the above-mentioned check for the presence or fulfillment of the precondition, since the precondition is fulfilled when the address of the EtherCAT protocol telegram, the second sender address MAC2 and the predetermined sender address, the second sender address MAC2, match. Accordingly, the processing unit knows that the connection between the first network subscriber 305 and the first protocol subscriber 120 has been determined to be trusted by the master subscriber 105. Therefore, the processing unit outputs the EtherCAT protocol telegram to the first protocol subscriber 120 via the fourth input/output port P3 stored in the routing table in the memory unit of the first network distributor 160 via the second data line 210. In the context, the further checks for the presence of the port identifier, for the presence of the first identifier of the telegram identifier, or for the presence of the first identifier of the telegram identifier and the second identifier of the telegram identifier need not be performed by the processing unit of the first network distributor 160, for example. Alternatively, it is conceivable that the further checks are performed anyway.

The above checks in connection with the example described with respect to the third network distributor 180, the presence of the port identifier in the memory unit 405 of the third network distributor 180, and the presence of the telegram identifier for the protocol telegram of the third network subscriber 315 by the processor unit 400 may also be varied in order. For example, in a first method step, the processor unit 400 may check the precondition under which the checking and discarding of a protocol telegram is set, i.e. as described above, whether the address, that is the first sender address MAC1, matches the predetermined address, the predetermined sender address. In a second method step, the processor unit 400 of the third network distributor 180 may be embodied to check whether a port identifier for the third input/output port P2 of the third network distributor 180 is stored for the protocol telegram of the third network subscriber 315. In a third method step, the processor unit 400 may further check whether the protocol telegram comprises a telegram identifier, and identify the protocol telegram as such via the existing telegram identifier. Furthermore, the processor unit 400 may also be embodied to execute the method steps in reverse order, i.e. to first check whether the protocol telegram comprises the telegram identifier and then to check whether a port identifier is stored for the third input/output port P2 of the third network distributor 180. However, it makes sense to continue to retain the first method step as such as the first method step.

The described examples do not restrict to blocking an EtherCAT protocol telegram via the third input/output port P2 of the third network distributor 180 from the third network subscriber 315 or forwarding an EtherCAT protocol telegram via the eighth input/output port P7 of the first network distributor 160 from the first network subscriber 305. They were chosen merely as examples to explain the method and the mode of operation of the network distributors 115.

For example, in addition to blocking protocol telegrams received via the third input/output port P2 of the third network distributor 180 from any protocol subscriber 101, the master subscriber 105 may also act similarly for the third input/output port P2, the sixth input/output port P5, and the seventh input/output port P6 of the first network distributor 160 and block said input/output ports from receiving protocol telegrams from unknown network subscribers 300 that are not embodied as protocol subscribers 101. If the first network subscriber 305 connected via the eighth input/output port P7 of the first network distributor 160 was not trusted to output EtherCAT protocol telegrams, the master subscriber 105 could also similarly proceed to block the aforementioned input/output ports PX of the first network distributor 160.

In order for the third network subscriber 315 as well as the first network subscriber 305 and the second network subscriber 310 to be able to communicate with the master subscriber 105 and the protocol subscribers 110 e.g. via the OPC-UA protocol underlying the telegrams from the control level or the Internet, in order to be able to perform diagnostics or store data in a cloud, the master subscriber 105 must store the individual communication connections in the routing tables of the network distributors 115. For example, that the first network distributor 160 outputs a telegram with OPC-UA protocol from the first network subscriber 305 via the first input/output port P0 via the first data line 205 to the master subscriber 105, or outputs a telegram with OPC-UA protocol via the fourth input/output port P3 and the second data line 210 to the first protocol subscriber 120, etc. As well, for example, that the third network distributor 180 is configured to output a telegram with OPC-UA protocol from the third network subscriber 315, which the third network distributor 180 receives via the third input/output port P2, via the first input/output port P0 of the third network distributor 180 and via the eighth data line 240 via the fifth protocol subscriber 140 to the third input/output port P2 of the second network distributor 170. The second network distributor 170 is embodied to receive the telegram with the OPC-UA protocol from the third network subscriber 315 via the third input/output port P2 and to send it to the first network distributor 160 via the first input/output port P0 via the sixth data line 230 via the third protocol subscriber 130, and furthermore that the first network distributor 160, i.e. its processor unit 400, is embodied to send the telegram to the master subscriber 105 via the first input/output port P0. An explanation of the individual target addresses and sender addresses of the telegrams in connection with the input/output ports PX is omitted at this point.

Figure 3:
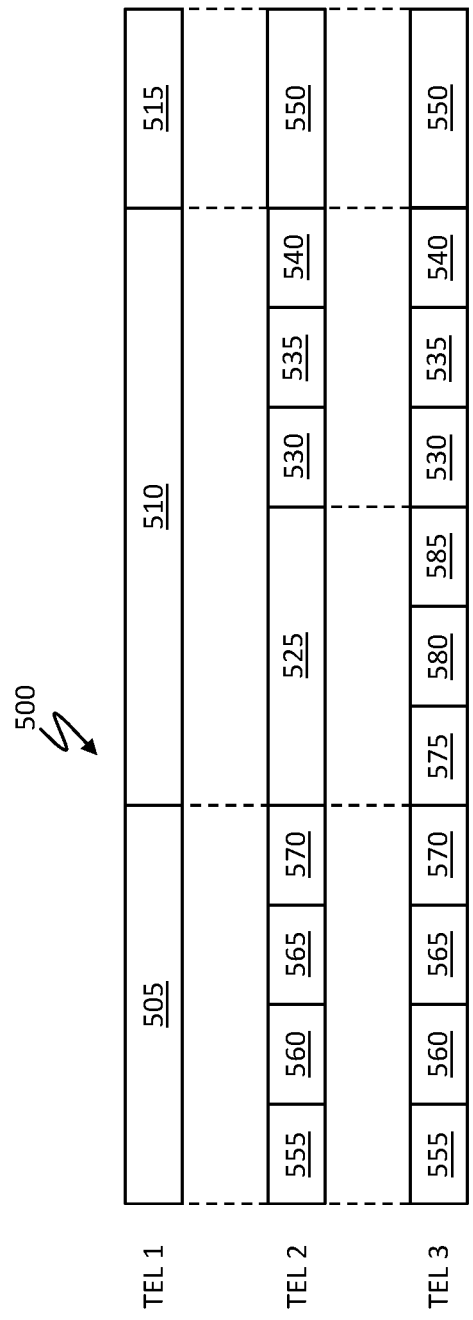
FIG. 3 shows a schematic diagram of a first to third telegram structure of a data structure used in a method for transmitting data in the automation network.

FIG. 3 shows a schematic structure of a data structure 500, which is used in the method for transmitting data in the automation network 100 shown in FIG. 1. The data structure 500 may be embodied as a protocol telegram and have a length of 64 to 1518 bytes or, if a TAG field is present, 64 to 1522 bytes if the protocol telegram is embodied as an Ethernet telegram. The data structure 500 in FIG. 3 has a first telegram structure TEL1 and comprises an Ethernet header section 505, an Ethernet data section 510 and an Ethernet end section 515. For example, the data structure 500 may be embodied according to IEEE standard 802.3 and comprise the Ethernet data frame format for packet-oriented transmission of data. If the data structure 500 is embodied for the real-time capable EtherCAT protocol in addition to complying with the Ethernet data frame structure, the data structure 500 comprises a second telegram structure TEL2. Preferably, the protocol telegrams output by the master subscriber 105 as well as the protocol telegrams output by the first network subscriber 305, the second network subscriber 310 and/or the third network subscriber 315 are embodied as EtherCAT telegrams and may thus have the second telegram structure TEL2 in the basic structure. If other field bus protocols are used in the automation network 100 for telegram traffic in control mode, the telegram structure may be similar to the second telegram structure TEL2 and/or similar to the first telegram structure TEL1.

The Ethernet header section 505 has a target address field 555 which comprises a target address that identifies the network subscriber 300 in FIG. 1 that is to receive the EtherCAT telegram (so-called unicast address). The target address may also be a multicast address (addressing of a plurality of network subscribers 300 in the automation network 100) or a broadcast address (addressing of all network subscribers 300 in the automation network 100). The target address may be embodied as a MAC address. If the target address is realized as a VLAN ID or as a segment address for an EtherCAT segment, a TAG field 565 may have the target address implemented as a VLAN ID or as a segment address. Following the target address field 555, the Ethernet header section 505 comprises a sender address field 560. The sender address field 560 comprises a sender address, which may be a MAC address, identifying the sender. In particular, the sender address may be the address by which the processor unit 400 in FIG. 2 performs a comparison with the predetermined address stored in the memory unit 405, which is then also embodied as a sender address, in order to verify the presence or the fulfillment of the precondition under which the checking and discarding of the protocol telegram is set. The target address field 555 and the sender address field 560 each comprise 6 bytes.

Furthermore, the Ethernet header section 505 has the TAG field 565 following the sender address field 560. This may, for example, be embodied as a VLAN TAG TAG field in accordance with the IEEE 802.1Q standard (VLAN: Virtual Local Area Network) and comprise 4 bytes. The TAG field 565 may also be embodied as a ROUT TAG TAG field if the target address is accommodated as a segment address in the TAG field 565. Following the TAG field 565, the Ethernet header section 505 has the aforementioned protocol field 570. The protocol field 570 may be formed as a so-called "Ethertype" field, having 2 bytes and comprising an Ethertype value indicating a used protocol of the next higher layer within user data, i.e. within the Ethernet data section 510. A layer and the next higher layer are defined according to the Open Systems Interconnection (OSI) model, which is the reference model for protocols in a layered architecture. For example, the protocol field 570 comprises the Ethertype value 0x88A4 (in the hexadecimal system) if the protocol telegram is embodied as an EtherCAT telegram, since this value is associated with the real-time capable EtherCAT protocol. The Ethertype field, i.e. the protocol field 570, shows the first identifier of the telegram identifier if the telegram is embodied as a protocol telegram. Specifically, when the protocol telegram is formed as an EtherCAT telegram, the protocol field comprises the Ether type value 0x88A4 in the hexadecimal system. The processor unit 400 may recognize the EtherCAT protocol telegram as a protocol telegram based on the ethertype value.

In the second telegram structure TEL2, the Ethernet data section 510 of the data structure 500 has a further header section. The further header section is formed here as a field bus protocol header section 525, which comprises instructions for the protocol subscribers in the automation network 100. Preferably, the field bus protocol header section 525 is formed as an EtherCAT header section. Furthermore, the Ethernet data section 510 comprises EtherCAT data, which may be implemented in the form of datagrams. For example, the Ethernet data section 510 may include a first datagram 530, a second datagram 535, and an nth datagram 540, wherein the nth datagram 540 indicates that the data structure 500 may include any number of datagrams in total. At this point, however, no limitation is intended to be placed on any particular number of datagrams in the data structure 500.

Moreover, the Ethernet end section 515 comprises a checksum field 550 in the second telegram structure TEL2. Furthermore, the Ethernet end section 515 may have a padding field. The padding field brings the EtherCAT telegram in the Ethernet data frame to the necessary minimum size of the Ethernet data frame of 64 bytes by inserting additional bytes added as pad into the EtherCAT telegram. The padding field may be necessary if e.g. less than 46 or 42 bytes (without or with a VLAN TAG conforming to the IEEE 802.1Q standard) are to be transmitted with the EtherCAT telegram as user data, wherein a preamble and a start frame delimiter (SFD) field, which are not included in FIG. 3, are not counted. The checksum field 550 may be used to ensure an integrity check of transmitted data. For this purpose, the checksum field 550 may e.g. comprise a calculated CRC checksum (CRC: Cyclic Redundancy Check), which is calculated via the Ethernet data frame, the data structure 500, starting with a target address and ending with the padding field, so that the checksum itself is not included in the CRC checksum. The CRC checksum is created by the sender and appended to the padding field. The recipient performs the same CRC checksum calculation after receiving the EtherCAT telegram and if the CRC checksum calculated by the recipient does not match the CRC checksum transmitted with the EtherCAT protocol telegram, the recipient assumes that the data transmission was faulty. In such a case, the EtherCAT protocol telegram may be discarded by the recipient.

In a third telegram structure TEL3 of the data structure 500, the further header section, which is embodied as a field bus protocol header section 525 and preferably as an EtherCAT header section, comprises a length field 575 when embodied as an EtherCAT header section. The length field 575 provides information on the length of the datagrams in the Ethernet data section 510. The length field 575 comprises 11 bits. Following the length field 575, the field bus protocol header section 525 embodied as EtherCAT header section comprises a reserve field 580 of 1 bit. By default, the reserve field is not used. Following the reserve field 580, the field bus protocol header section 525 embodied as an EtherCAT header section comprises a type field 585 with 4 bits. The type field 585 may have the second identifier of the telegram identifier. The second identifier of the telegram identifier may be formed as EtherCAT protocol type. For the EtherCAT protocol type, 16 different values are available for representation, i.e., the values from zero to 15, of which the value 0x1 in the hexadecimal system may serve as the second identifier of the telegram identifier, for indicating the processing of an EtherCAT protocol telegram for the processing unit of a protocol subscriber 110. It is conceivable that the processor unit 400 recognizes an EtherCAT protocol telegram either via the first identifier of the telegram identifier, i.e. the Ether type value in the hexadecimal system for the EtherCAT protocol in the protocol field 570, or via the first identifier of the telegram identifier in the protocol field 570 and the second identifier of the telegram identifier in the type field 585, i.e. the EtherCAT protocol type with the value 0x1 in the hexadecimal system.

Moreover, the EtherCAT protocol telegram may also be embedded in a UDP/IP (UDP: User Datagram Protocol, IP: Internet Protocol) data frame structure. In that case, the Ethernet header section 505 comprises the target address field 555 and the sender address field 560. Following the sender address field 560, the Ethernet header section 505 comprises the protocol field 570, wherein the protocol field 570 has a value of 0x0800 (in hexadecimal) indicating the Internet Protocol (IPv4, Internet Protocol Version 4). The protocol field 570 is followed by an IP header section and a UDP header section in the Ethernet header section 505. The field bus protocol header section 525 formed as the EtherCAT header section, the datagrams, and the Ethernet end section 515 may be formed similarly to the above description in the case in which the Ethernet end section 515 may include the checksum field 550 and the padding field, if applicable. Furthermore, the EtherCAT protocol telegram may still have the TAG field 565 in addition to the embedding in the UDP/IP data frame structure, wherein the TAG field 565 may be formed as a VLAN TAG in this case. The TAG field 565 is then arranged similarly to the second telegram structure TEL2 or similarly to the third telegram structure TEL3. It is also conceivable that the EtherCAT protocol telegram has the aforementioned ROUT TAG instead of the VLAN TAG. Accordingly, the processor unit 400 may also be set by the master subscriber 105 to recognize the EtherCAT protocol telegram as the first identifier of the telegram identifier when embedded in a UDP/IP data frame structure via the Ether type value 0x0800.

The present invention is not limited to the real-time EtherCAT protocol, but may also be applied to other protocols at the control level, which is the level of central machine control, as well as at the field level, which is the level at which control of the processes is carried out directly by the sensors and actuators.

The present invention has been described in detail by preferred embodiment examples. Instead of the described examples of embodiment, further examples of embodiment are conceivable, which may have further variations or combinations of described features. For this reason, the invention is not limited by the disclosed examples, since other variations may be devised therefrom by those skilled in the art without departing from the protective scope of the invention as claimed.

TABLE 1

List of Reference Symbols: 100-615

| | |
|---|---|
| 100 automation network | 300 network subscribers |
| 101 protocol subscribers | 305 first network subscriber |
| 105 master subscriber | 310 second network subscriber |
| 110 slave protocol subscriber | 315 third network subscriber |
| 115 network distributor | 400 processor unit |
| 120 first protocol subscriber | 405 memory unit |
| 125 second protocol subscriber | 500 data structure |
| 130 third protocol subscriber | 505 Ethernet header section |
| 135 fourth protocol subscriber | 510 Ethernet data section |
| 140 fifth protocol subscriber | 515 Ethernet end section |
| 145 sixth protocol subscriber | 525 EtherCAT header section |
| 150 seventh protocol subscriber | 530 first datagram |
| 160 first network distributor | 535 second datagram |
| 170 second network distributor | 540 nth datagram |
| 180 third network distributor | 550 checksum field |
| 200 data line network | 555 target address field |
| 205 first data line | 560 sender address field |
| 210 second data line | 565 TAG field |
| 215 third data line | 570 protocol field |
| 220 fourth data line | 575 length field |
| 225 fifth data line | 580 reserve field |
| 230 sixth data line | 585 type field |
| 235 seventh data line | 600 first interaction line |
| 240 eighth data line | 605 second line of interaction |
| 245 ninth data line | 610 third line of interaction |
| 250 tenth data line | 615 fourth line of interaction |
| 255 eleventh data line | |

TABLE 2

Additional Reference Symbols

| | |
|---|---|
| P0 first input/output port | a first segment address |
| P1 second input/output port | c second segment address |
| P2 third input/output port | MAC1 first sender address |
| P3 fourth input/output port | MAC2 second sender address |
| P4 fifth input/output port | TEL1 first telegram structure |
| P5 sixth input/output port | TEL2 second telegram structure |
| P6 seventh input/output port | TEL3 third telegram structure |
| P7 eighth input/output port | |
| PX input/output ports | |

The invention claimed is:

1. A network distributor comprising:
   a plurality of input-output ports,
   a processor unit, and
   a memory unit;
   wherein the plurality of input-output ports are configured to connect respective network subscribers via a data line network, wherein the network subscribers comprise protocol subscribers configured to process telegrams formed as protocol telegrams,
   wherein a port identifier is stored in the memory unit if the network subscriber connected via an input-output port is a protocol subscriber,
   wherein the processor unit is configured to receive telegrams via an input-output port and to output telegrams via a further input-output port stored in a routing table in the memory unit, and
   wherein the processor unit is further configured to check a telegram to determine whether the telegram is a protocol telegram and has been received via an input-output port for which no port identifier is stored in the memory unit, and to discard the telegram if the check is positive,
   wherein the checking and discarding of the telegram are subject to a precondition to be considered by the processor unit, and wherein fulfillment of the precondition leads to an exception from discarding the telegram.

2. The network distributor according to claim 1,
wherein the processor unit is configured to check whether the telegram received via the input-output port has a telegram identifier, and
wherein the processor unit is configured to recognize the telegram as a protocol telegram based on the telegram identifier.

3. The network distributor according to claim 2,
wherein a telegram formed as a protocol telegram is formed as an Ethernet telegram,
wherein the Ethernet telegram comprises an Ethernet header section and an Ethernet data section,
wherein the telegram identifier comprises a first identifier and a second identifier,
wherein the Ethernet header section comprises the first identifier of the telegram identifier, and
wherein the processor unit is configured to evaluate the first identifier of the telegram identifier in the Ethernet header section.

4. The network distributor according to claim 2,
wherein a telegram formed as a protocol telegram is formed as an Ethernet telegram,
wherein the Ethernet telegram comprises an Ethernet header section and an Ethernet data section,
wherein the Ethernet data section comprises a field bus protocol header section,
wherein the telegram identifier comprises a first identifier and a second identifier,
wherein the Ethernet header section comprises the first identifier of the telegram identifier and the field bus protocol header section comprises the second identifier of the telegram identifier, and
wherein the processor unit is configured to evaluate the first identifier of the telegram identifier in the Ethernet header section and the second identifier of the telegram identifier in the field bus protocol header section.

5. The network distributor according to claim 1, wherein the precondition under which a checking and discarding of a telegram is set comprises determining whether the address of the telegram corresponds to a predetermined address.

6. An automation network comprising a plurality of network subscribers interconnected by a data line network,
wherein network subscribers are configured as protocol subscribers for processing telegrams that are configured as protocol telegrams,
wherein the automation network comprises at least one network distributor comprising a plurality of input-output ports, a processor unit, and a memory unit,
wherein the plurality of input-output ports are configured to respectively connect network subscribers via the data line network,
wherein a port identifier is stored in the memory unit if the network subscriber connected via the input-output port is a protocol subscriber,
wherein the processor unit is configured to receive a telegram via an input-output port and to output it via a further input/output input-output port stored in a routing table in the memory unit, and
wherein the processor unit is further configured to check a telegram as to whether the telegram is a protocol telegram and has been received via an input-output port for which port identifier is stored in the memory unit, and to discard the telegram if the check is positive,
wherein the checking and discarding of the telegram are subject to a precondition to be considered by the processor unit, and
wherein fulfillment of the precondition leads to an exception from discarding the telegram.

7. The automation network according to claim 6,
wherein the processor unit is configured to check whether the telegram received via the input-output port has a telegram identifier, and
wherein the processor unit is configured to recognize the telegram as a protocol telegram based on the telegram identifier.

8. The automation network according to claim 6, which is configured as a master-slave system,
wherein a protocol subscriber is configured as the master subscriber, which is configured to output telegrams configured as protocol telegrams via the data line network,
wherein the master subscriber is further configured to set, in the processor unit of the network distributor, that no protocol subscriber is connected to an input-output port of the network distributor.

9. The automation network according to claim 8,
wherein the master subscriber is configured to predefine a network structure of the network subscribers and to transmit the predefined network structure to the processor unit of the network distributor via the data line network, and
wherein the processor unit is configured to tag the input-output ports of the network distributor to which protocol subscribers are connected via the data line network with the port identifier in the memory unit based on the predetermined network structure.

10. The automation network according to claim 8,
wherein the master subscriber is configured to detect a network structure of the network subscribers by query telegrams,
wherein, when a network subscriber configured as a protocol subscriber receives a query telegram, the protocol subscriber is configured to enter protocol subscriber information into the query telegram and to return the query telegram to the master subscriber if no subsequent protocol subscriber is connected via the data line network,
wherein, when the network distributor receives a query telegram via the input-output port, the network distributor is configured to enter port information into the query telegram and to return the query telegram to the master subscriber,
wherein the master subscriber is configured to output further query telegrams to the network distributor on the basis of the port information, which further query telegrams are forwarded by the processor unit of the network distributor to the network subscriber connected via the data line network via the further input-output port stored for the respective query telegram in the routing table in the memory unit,
wherein the master subscriber is configured to communicate, based on the protocol subscriber information of the received further query telegrams, to the processor unit of the network distributor to which of the plurality of input-output ports of the network distributor protocol subscribers are connected via the data line network, and
wherein the processor unit is configured to identify the input-output ports of the network distributor to which a protocol subscriber is connected via the data line network with the port identifier in the memory unit.

11. A method for transmitting data in an automation network comprising a plurality of network subscribers and at least one network distributor which are interconnected via a data line network,
- wherein the network subscribers comprise protocol subscribers configured to process telegrams configured as protocol telegrams,
- wherein the network distributor comprises a plurality of input-output ports, a processor unit, and a memory unit,
- wherein the plurality of input-output ports are configured to respectively connect network subscribers via the data line network,
- wherein the processor unit receives a telegram via an input-output port and outputs it via a further input-output port stored in a routing table in the memory unit, and
- wherein the processor unit checks a telegram to determine whether the telegram is a protocol telegram and has been received via an input-output port for which it is preset that no protocol subscriber is connected, and discards the telegram if the check is positive,
- wherein the checking and discarding of the telegram are subject to a precondition to be considered by the processor unit, the precondition comprising determining whether the address of the telegram corresponds to a predetermined address, and
- wherein fulfillment of the precondition leads to an exception from discarding the telegram.

12. The method according to claim 11, wherein the processor unit checks whether a port identifier for a protocol subscriber connected via the input-output port of the network distributor is stored in the memory unit.

13. The method according to claim 11, wherein the processor unit checks whether the telegram has a telegram identifier that identifies the telegram as a protocol telegram.

14. The method according to claim 13,
- wherein a telegram configured as a protocol telegram is configured as an Ethernet telegram,
- wherein the Ethernet telegram comprises an Ethernet header section and an Ethernet data section,
- wherein the telegram identifier comprises a first identifier and a second identifier,
- wherein the Ethernet header section comprises the first identifier of the telegram identifier, and
- wherein the processor unit is configured to evaluate the first identifier of the telegram identifier in the Ethernet header section.

15. The method according to claim 13,
- wherein a telegram configured as a protocol telegram is configured as an Ethernet telegram,
- wherein the Ethernet telegram comprises an Ethernet header section and an Ethernet data section,
- wherein the Ethernet data section comprises a field bus protocol header section,
- wherein the telegram identifier comprises a first identifier and a second identifier,
- wherein the Ethernet header section comprises the first identifier of the telegram identifier and the field bus protocol header section comprises the second identifier of the telegram identifier, and
- wherein the processor unit is configured to evaluate the first identifier of the telegram identifier in the Ethernet header section and the second identifier of the telegram identifier in the field bus protocol header section.

* * * * *